April 21, 1953 E. E. WEMP 2,635,722
CLUTCH AND CLUTCH CONTROL MECHANISM
Original Filed Oct. 15, 1943 6 Sheets-Sheet 4

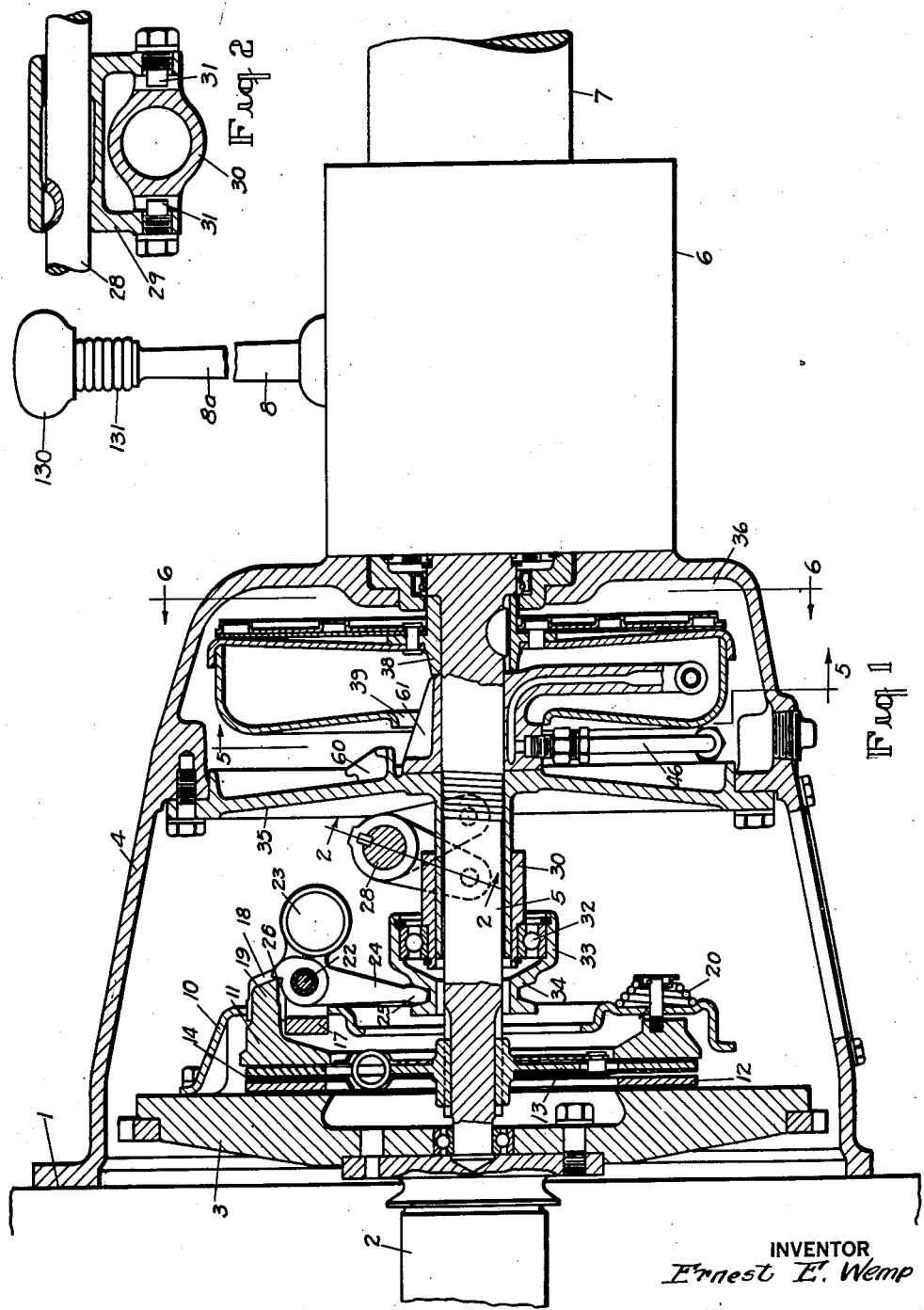

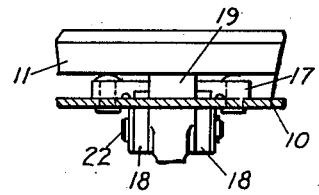
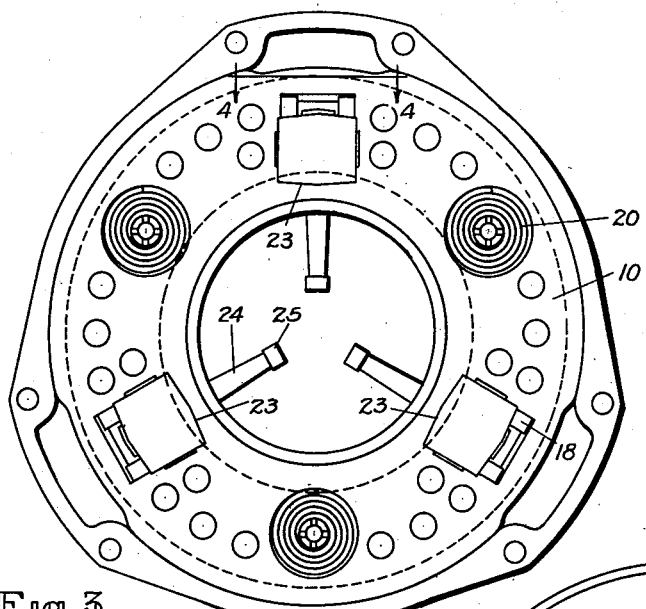
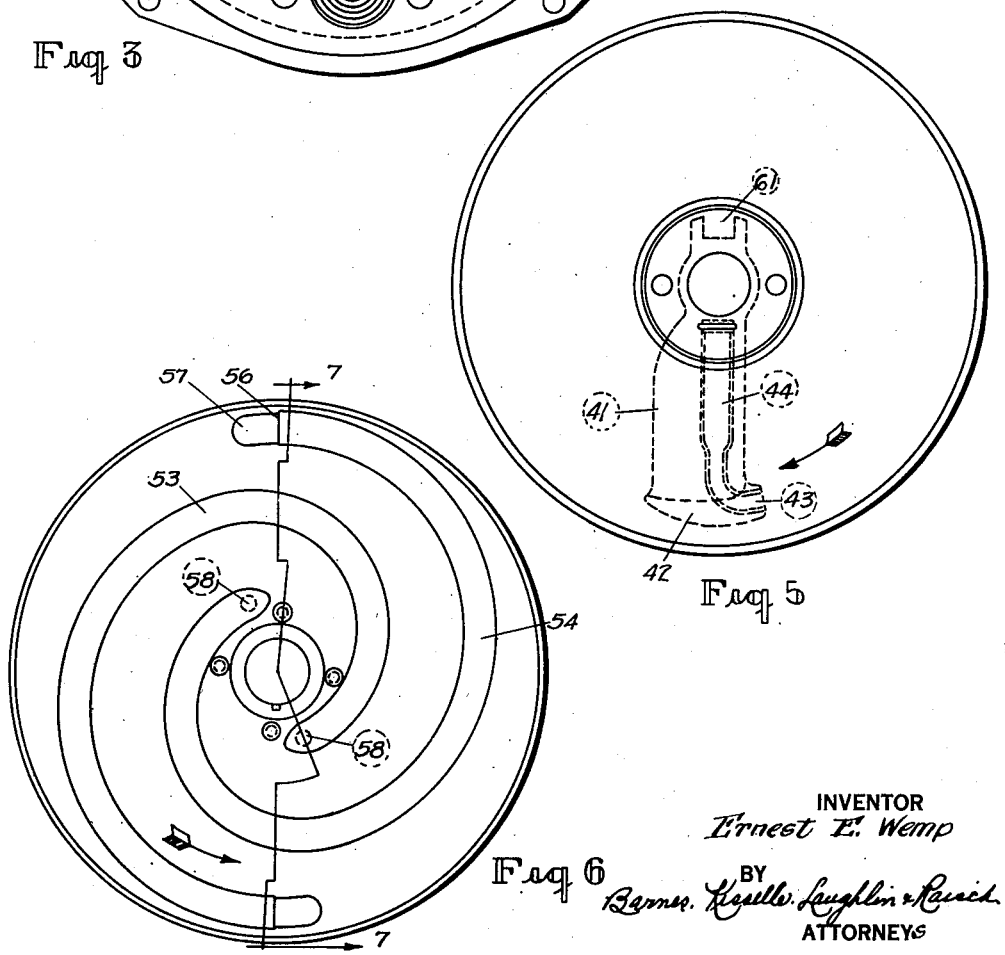

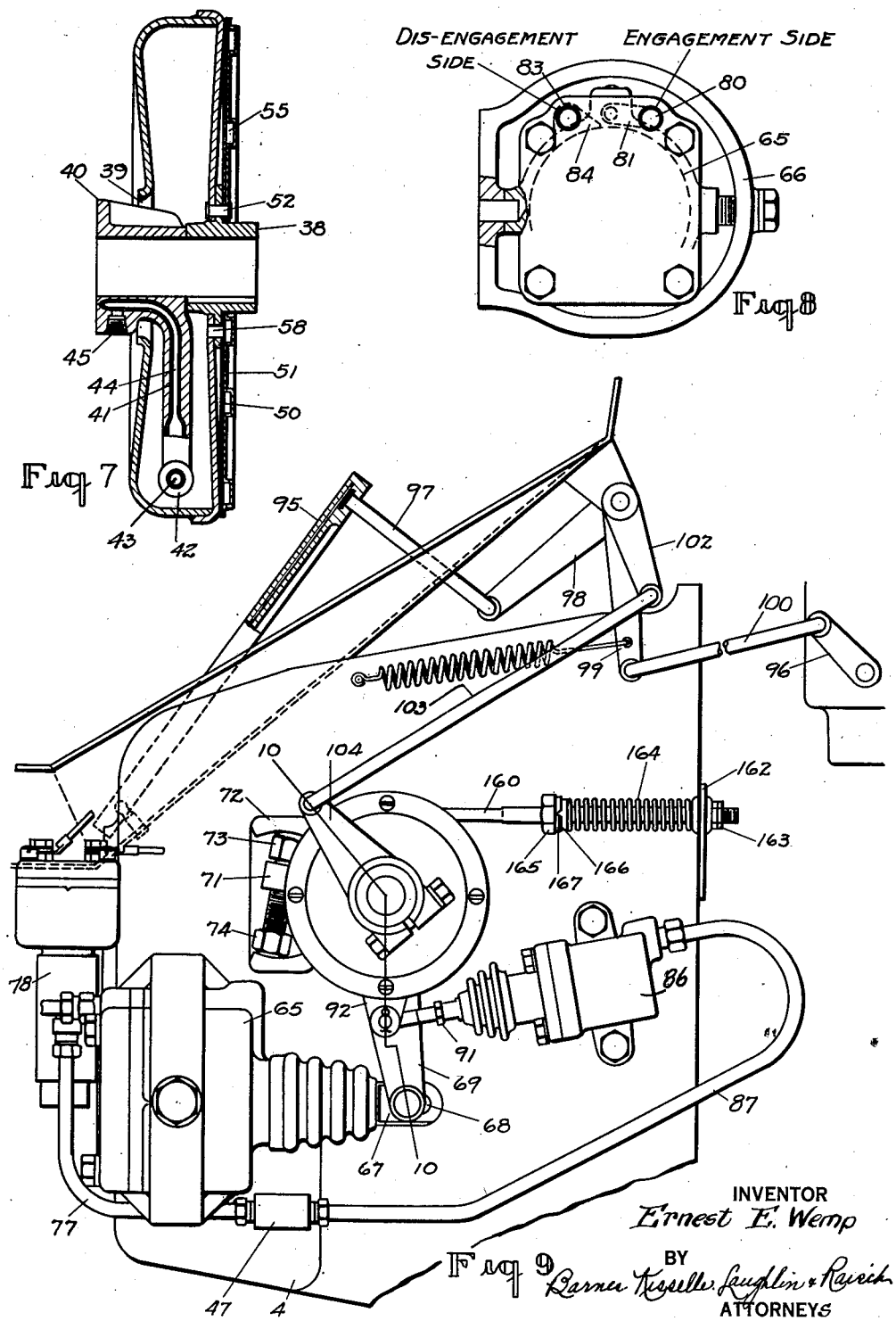

INVENTOR
Ernest E. Wemp
BY
Barnes, Kisselle, Laughlin & Raisch
ATTORNEYS

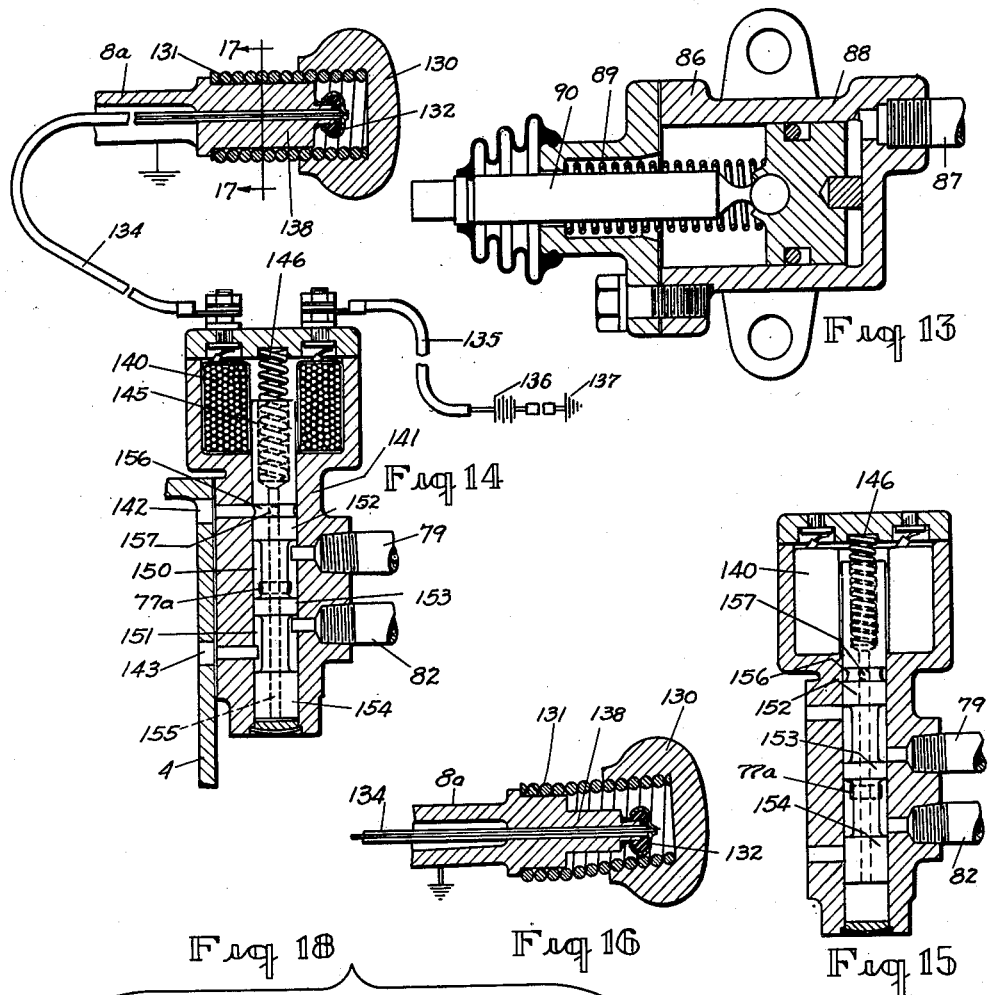

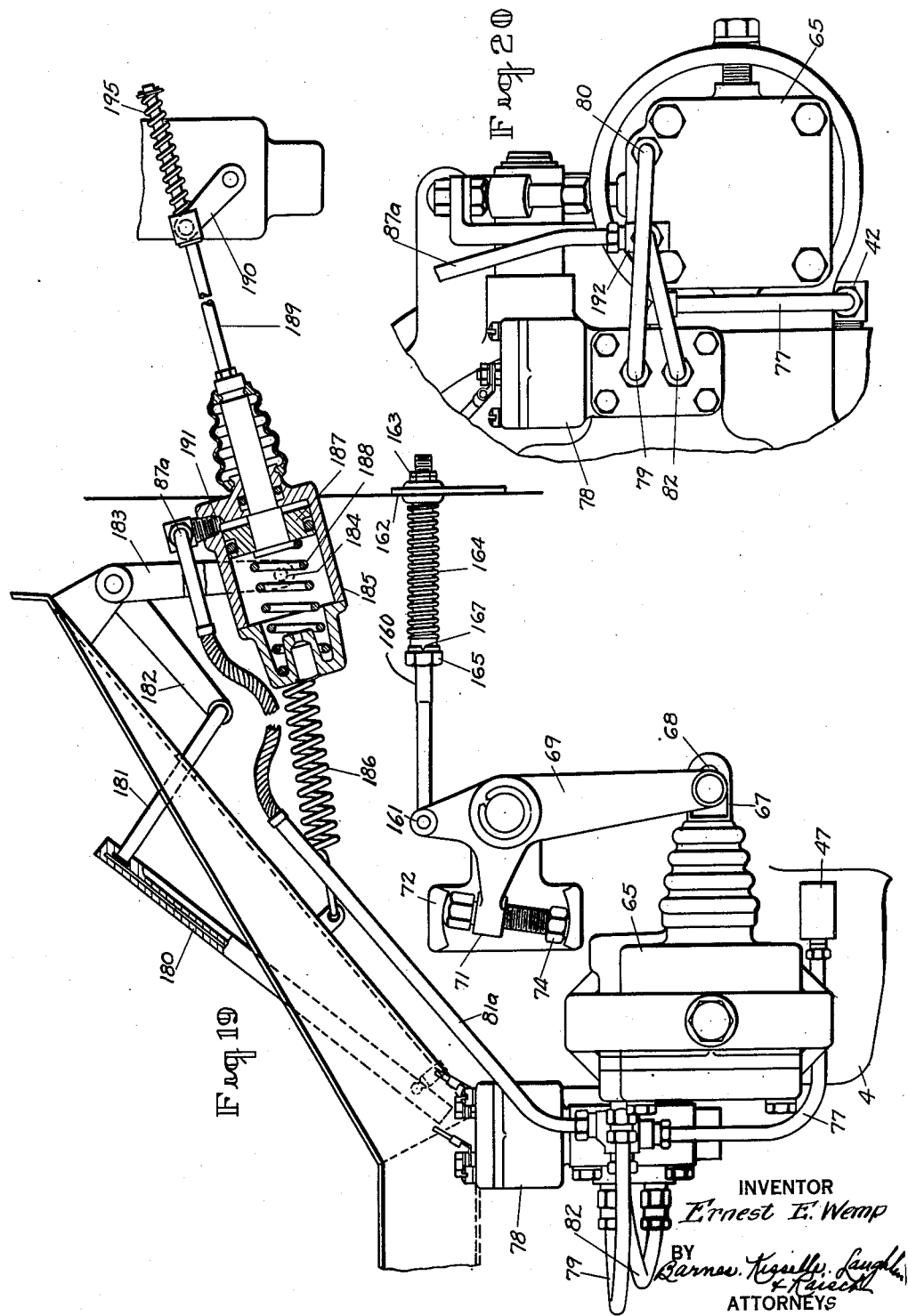

Patented Apr. 21, 1953

2,635,722

UNITED STATES PATENT OFFICE

2,635,722

CLUTCH AND CLUTCH CONTROL MECHANISM

Ernest E. Wemp, Detroit, Mich.; William O'Neill Kronner and Lila A. Wemp, executors of said Ernest E. Wemp, deceased Original application October 15, 1943, Serial No. 506,402, now Patent No. 2,479,532, dated August 16, 1949. Divided and this application May 4, 1949, Serial No. 91,294

9 Claims. (Cl. 192—3.5)

This invention has to do with the transmission of power from a power source to driven means, where the torque line is to be interrupted at times for one purpose or another and then re-established. The invention is concerned particularly with an arrangement for the transmission of power from an engine in an automotive vehicle where the engine is to be disconnected from the traction wheels of the vehicle for the changing of gears to effect different driving ratios and to permit the engine to run while the vehicle is at rest.

This application is a division of co-pending application Serial No. 506,402, filed October 15, 1943, Patent No. 2,479,532, dated August 16, 1949.

The invention relates to what may be termed a clutch and clutch control arrangement wherein the clutch is engageable and disengageable for gear shifting purposes or the like. In accordance with the invention a centrifugal clutch is provided which is designed to be disengaged at engine idling speeds but which becomes engaged upon acceleration of the engine above idling speeds. Thus the clutch is of an automatic nature. The engine referred to in the specific disclosure herein is an internal combustion engine which may be of the usual and well known type. In conjunction with the centrifugal clutch, are means for effecting clutch control and for supplementing the clutch packing pressure. In this connection the centrifugal clutch is relatively lightly centrifugally weighted so that the clutch, when acting under centrifugal force alone, is not capable of transmitting full engine torque until the engine has reached a fairly high R. P. M. The means for supplementing the clutch packing pressure is preferably a hydraulic arrangement, operable from a driven member, i. e. a member which operates only upon movement of the vehicle.

One of the objects of the invention is to provide an arrangement wherein the centrifugal clutch is disengaged at normal idling speed so that the engine may be running while the vehicle is at rest but which engages centrifugally upon acceleration of the engine above idling speed to initiate vehicle movement. The hydraulic system begins to function at a relatively low speed of movement of the vehicle. However, when the vehicle is decelerated the hydraulic system holds the clutch engaged at engine R. P. M. lower than the R. P. M. at which the clutch would disengage centrifugally. Therefore, the engine and the traction wheels remain coupled together upon the deceleration of the vehicle below the speed at which the centrifugal clutch would otherwise become disengaged.

A further object of the invention is to provide a nicety of clutch engagement which is afforded by the lightly weighted centrifugal clutch and wherein the packing pressure of the clutch is supplemented by the hydraulic system to provide adequate torque capacity at speeds lower than the speed where the centrifugal system is capable of providing clutch packing pressure sufficient for transmitting full engine torque.

Another object is to provide an arrangement where the end thrust caused by the hydraulic system is relieved at vehicle speeds at which vehicles quite usually are normally operated.

A further object of the invention is to provide a centrifugal clutch and a hydraulic control and pressure supplementing means wherein the hydraulic pressure is variable in a manner similar to the variation of centrifugal force with variation in R. P. M. It is of course well known that centrifugal force increases with the square of the speed; the hydraulic system advantageously embodies a pump arrangement functioning from centrifugal head and velocity head of the liquid, both of which increase with the square of the speed. Thus the pump constitutes both a pump and pressure regulator. In other words, there is a pumping action upon vehicle movement and the pressure thereof varies with the square of the speed. This liquid pressure is employed to supplement the clutch packing pressure and to also release the clutch against centrifugal force at any speed of operation. Obviously, it takes more force to release the clutch against centrifugal action at high R. P. M. than it does at low R. P. M. but since the liquid pressure varies with the square of the speed as does the centrifugal force of the clutch, the pressure is adequate to disengage the clutch at any operating R. P. M.

A still further object of the invention is to standardize the procedure of clutch release and clutch engagement, while at the same time allowing the individual operator a wide latitude for the exercise of his own prerogatives in driving the vehicles. To this end, clutch disengagement and clutch engagement is effected automatically through the hydraulic system when, for example, there is to be a shift of gears made while the clutch is disengaged. The manner of engagement of a clutch, however, cannot be disassociated from the relative engine and vehicle speeds. Some operators operate the engine at a high R. P. M. just prior to clutch engagement, with the result there is considerable clutch slippage before the engagement is complete. Other operators attempt, more or less, to synchronize the engine R. P. M. with vehicle speed for a minimum of clutch slippage. In accordance with this last mentioned object of this invention, the control of the operation of the engine is automatically governed during the period of clutch disengagement and engagement. In other words, the automatic operation of the clutch is coordinated with an automatic control of the engine. To this end, the operator of a vehicle who desires to effect a change of gears performs a gear shifting action which results in automatic clutch disengagement, and before the clutch is disengaged the control of the throttle of the engine is taken over by the automatic means. In other words, the operation of the engine is taken out of the control of the driver and is governed by the clutch operating means. After the clutch has opened and the gear shift made, the driver, having completed the gear shift, discontinues the manual control and the clutch then begins to re-engage. When the clutch is sufficiently engaged the control of the throttle is released by the automatic means and restored to the driver. Thus it will be observed that the engine is not under the control of the driver during that period beginning in the disengaging action, continuing while the clutch is disengaged, and until the clutch is again at least partially engaged. Yet there is no dictation as to when an individual driver may make a shift of gears; this is left to the driver to exercise his own ideas and preferences of what may or may not be necessary to meet the exigencies of the situation. This phase of the invention will be better understood, as also will other objects of the invention when the detailed description is considered in conjunction with the accompanying drawings which show one form of apparatus for carrying out the invention in addition to a modified form of control.

Fig. 1 is a cross sectional view showing a centrifugal clutch and a liquid pump arrangement mounted in a bell housing associated with an internal combustion engine.

Fig. 2 is a sectional view taken substantially on line 2—2 of Fig. 1.

Fig. 3 is a rear elevational view of the centrifugal clutch.

Fig. 4 is a sectional view taken substantially on line 4—4 of Fig. 3 illustrating a clutch detail.

Fig. 5 is an elevational view taken substantially on line 5—5 of Fig. 1 showing the pump structure and illustrating some of the parts in dotted lines.

Fig. 6 is an elevational view of the opposite side of the pump structure and taken substantially on line 6—6 of Fig. 1.

Fig. 7 is a sectional view taken substantially on line 7—7 of Fig. 6.

Fig. 8 is a view of the clutch operating cylinder shown in Fig. 12, looking from the right hand side of Fig. 12 and showing some of the passageways in dotted lines.

Fig. 9 is a side elevational view of the clutch or bell housing illustrating various control mechanism for the clutch and for the throttle of the engine.

Fig. 13 is a sectional view taken through the cylinder in the throttle control system.

Fig. 14 is a sectional view taken through the solenoid valve of the hydraulic system showing the valve in clutch engagement position.

Fig. 15 is a sectional view similar to Fig. 14 showing the valve in clutch released position.

Fig. 16 is a sectional view through the manual control handle and taken at right angles to the illustration thereof in Fig. 14.

Fig. 17 is a sectional view taken substantially on line 17—17 of Fig. 14.

Fig. 18 is a bracketed view of a number of inter-fitting parts in the control system illustrated in section in Fig. 10.

Fig. 19 is a view, largely in side elevation showing a modified form of engine throttle control.

Fig. 20 is a view similar to Fig. 11 showing in elevation the control cylinder and piping of the modified form.

Figure 10:
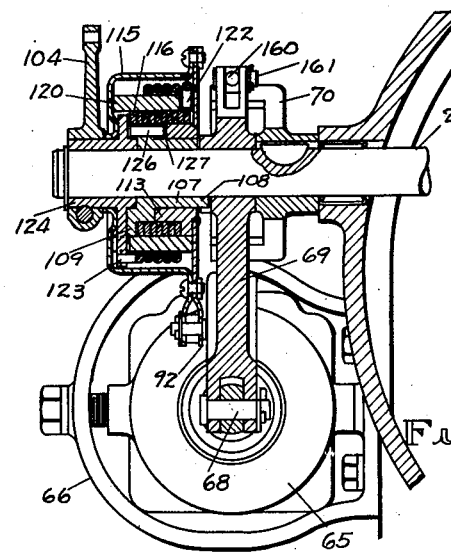
Fig. 10 is a sectional view taken substantially on line 10—10 of Fig. 9.

In Fig. 1 an engine block is illustrated at 1, the crank shaft at 2 and the flywheel at 3 which is positioned within the clutch housing 4. A driven shaft 5 is piloted at one end in the flywheel, as shown, and extends through the housing 4 and into a gear box 6 containing shiftable gears for varying the speed ratio between the driven shaft 5 and propeller shaft 7. The gears may be shifted through the means of a suitable shiftable element, such as a rod or the like 8.

The centrifugal clutch includes a cover plate 10 bolted to the flywheel and a pressure plate 11. The pressure plate and the flywheel are adapted to engage between them the facings 12 of a driven disc 13 mounted on the driven shaft 5. The facings are normally held yieldable spaced apart by suitable yielding means 14. A number of such yielding means are well known to those versed in the art.

Mounted on the cover plate are brackets 17 (Fig. 4) which are attached to the inside of the cover plate, each of which has a pair of projections or ears 18 extending out through an opening in the cover plate as shown in Fig. 3. There are three of such brackets and the pressure plate 11 has projecting tongues 19 which lie between the ears 18. Thus the pressure plate is drivingly associated with the cover plate and it can be shifted axially. The pressure plate is normally retracted into a clutch disengaged position by springs 20. As will later appear the action of the springs 20 may be supplemented by means located outside the housing. A combined lever and centrifugal weight is mounted between each pair of projections 18 on a pin 22 advantageously through the means of needle roller bearings as shown, and each has a weighted mass 23 and an inwardly extending lever arm 24 provided on its end with an involute tooth 25. Each weighted lever engages the adjacent projecting tongue of the pressure plate as indicated at 26. It will be apparent that the weighted masses provide an unbalanced condition so that upon rotation the levers are swung on their axes so that the lever arms 24 shift to the right as Fig. 1 is viewed and the pressure plate is pushed to the left and into engagement with the driven disc.

A clutch control shaft 28 has a yoke 29 thereon, the ends of the arms of which are engaged with a control sleeve 30 through the means of pin and slot connections 31 so that the yoke may shift the control sleeve in both directions. An anti-friction bearing 32 connects the control sleeve with a control sleeve part or element 33 having an annular groove 34 for receiving the involute ends 25 of the clutch levers 24. It will be observed any rocking movement of the clutch levers must be accompanied by a reciprocating movement of the control sleeve and vice versa. As shown in Fig. 3, there are three of the combined weight and lever elements.

The pump shown herein is mounted in the housing 4 which is divided by a partition 35 to provide a sump chamber 36. This pump comprises essentially two elements, namely, a shell or casing and Pitot tube mounted for relative rotation. The shell has one wall mounted on a hub 38 which is keyed to the driven shaft 5 while the other wall, which is axially spaced from the first wall, has a central opening 39. A hub element 40 journalled on the driven shaft has a radial extending arm 41, on the end of which is a head 42. There is an opening 43 in the head which opens substantially tangentially and a passage 44 extending through the arm and hub and to an outlet 45. An outlet pipe 46 connects at 45 and extends out through the wall of the housing 4 to an outlet fitting 47 (Fig. 9).

In the operation of the pump, the shell rotates and a quantity of the liquid is maintained therein which liquid, due to centrifugal force, forms an annular ring of liquid in the shell. The pressure at the inlet of the Pitot tube is represented by centrifugal head plus velocity head. The oil enters the passage and is caused to flow through the outlet pipe. In the normal operation of the hydraulic system herein disclosed, there is no actual flow of liquid needed but a pressure must be maintained. When there is no flow through the Pitot tube channel, the oil in the shell merely flows past the Pitot tube and its head and as will be observed by reference to Fig. 5, the Pitot tube and its head are streamlined to minimize friction and resistance. The Pitot head is perfectly streamlined on its radius as illustrated. When the parts come to rest, some of the oil in the shell will be dumped but the oil will be maintained in the lower portion of the shell up to the level of the opening 39. Upon the commencement of operation, this volume of oil is sufficient to start the pump and supply the initial quantity of oil. To this end, it will be noted that the head of the Pitot tube is disposed near the periphery of the shell so that it will be at all times submerged.

Suitable means may be provided to keep the shell full of oil during operation. One such means may take the form of a lift pump of the Archimedes spiral type. The structure may comprise two sheet metal plates 50 and 51 placed face to face and secured to the hub at 52. The plate 51 is formed with two spiral grooves 53 and 54 which provide channels 55. These are open at their outer ends as at 56 where the plate 51 is provided with an aperture 57 and their inner ends communicate with inlet apertures leading into the shell as at 58. During rotation of the shell the channels lift the liquid and discharge the same into the shell and thus keep it full. A structure for keeping the shell full of oil by the operation system is shown in Fig. 1 herein. The partition 35 is provided with a trough formation 60, the lower end of which discharges oil into a formed groove 61 in the hub. In normal operation the oil in the sump is splashed and some of it falls into the trough 60 from where it flows through 61 into the shell. These two means for keeping the shell filled with oil may be used individually or together. The two Archimedes spirals are provided to keep the plates in balance.

The control mechanism as shown in Fig. 9 includes a clutch control cylinder 65 mounted on trunnions in bracket 66 so that it may rock in this cylinder (Fig. 12) is a piston 64 having a piston rod 67. This piston rod has a pin and slot connection 68 with a control arm 69. The clutch shaft 28 has yoke member 70 keyed thereto while the arm 69, which is of bell crank form, has an arm 71 operably connected to the yoke 70. The yoke has two abutments 72 while a bolt 73 is screw threaded through the arm 71 and it has a nut 74 screw threaded on its opposite end. In this way the control arm 69 and the rock shaft are coupled together but the coupling can be adjusted. To make an adjustment the bolt 73 is turned on its screw threads in 71 thus changing the relative position of the control arm and the clutch rock shaft. After the adjustment is made the nut 74 is adjusted to engage one of the abutments 72. It is easily understood that the head of the bolt and nut 74 engage the abutment 72 so that rocking of the arm 69 causes rocking of the clutch shaft. This adjustment is for clutch facing wear as will later appear.

Figure 12:
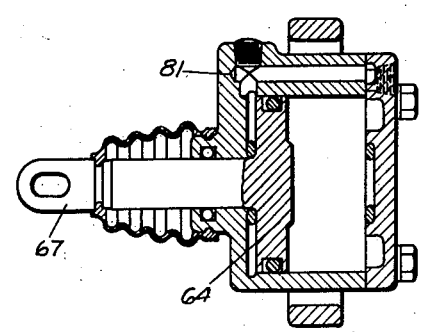
Fig. 12 is a sectional view taken through the clutch operating cylinder.
Figure 11:
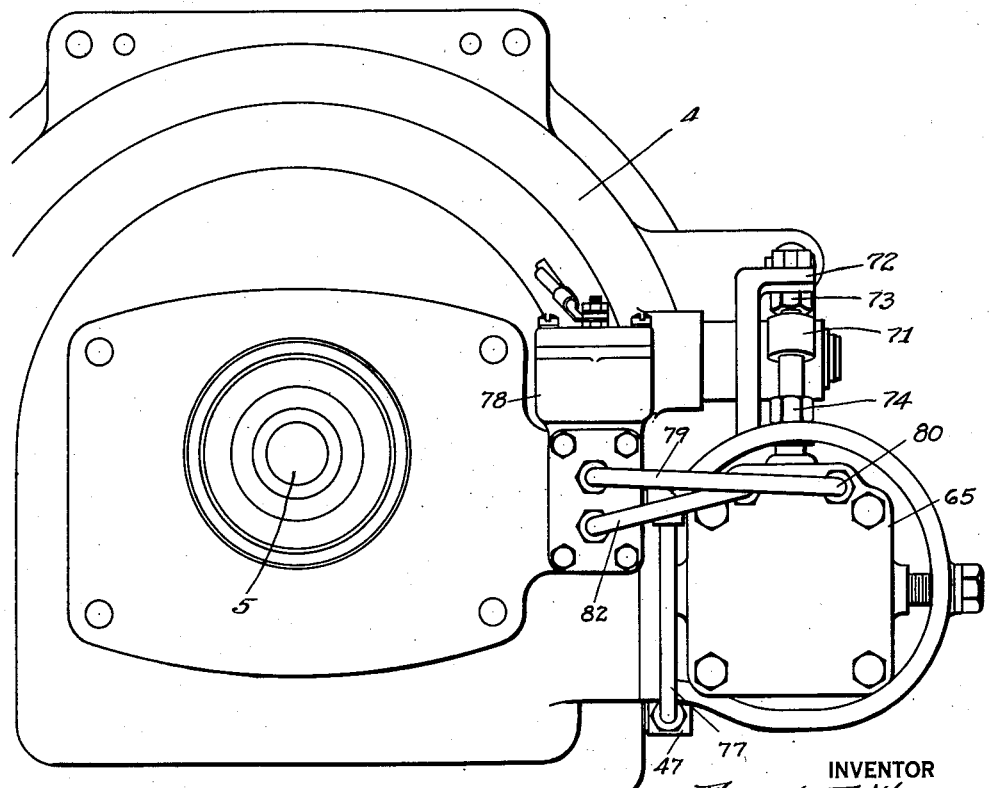
Fig. 11 is an end view of the clutch housing showing some of the control mechanism mounted thereon and illustrating the piping of the hydraulic system.

The pump outlet 47 is connected by a conduit 77 to a solenoid valve generally illustrated at 78. A conduit 79 extends from the valve and enters the cylinder 65 at 80 and connects to a passage 81 which connects into the cylinder on the rod side of the piston (Figs. 8 and 12). A conduit 82 extends from the valve and enters the cylinder at 83 through passage 84 and into the cylinder on the side of the piston opposite the rod 67. By a suitable operation of the valve, the pressure liquid may be introduced into either side of the cylinder while connecting the other side back to the sump. There is, what may be termed, an energizing cylinder 86 which is smaller than the cylinder 65 and a conduit 87 leads from the pump outlet 47 to one end of cylinder 86 as shown in Fig. 13. The piston 88 in this cylinder is acted upon by a spring 89 and it has a piston rod 90 with an adjustable connection 91 to an arm 92. Whenever the pump is in operation, the liquid under pressure is transmitted into cylinder 86 and the piston 88 is shifted to the left hand end of the cylinder as Fig. 13 is viewed.

The cylinder 86 has to do with the control of the engine throttle, an arrangement now to be described. The usual throttle treadle as shown at 95 connects to the carburetor lever 96, through a link 97 and arms 98 and 99 mounted for rocking movement in unison, and a link or rod 100. When the treadle 95 is depressed, the throttle arm 96 is rocked toward open position or clockwise as Fig. 9 is viewed. Rotatable with the crank arms 98 and 99 is an arm 102 connected by a link 103 with an arm 104 mounted on the clutch shaft 28.

Means are provided for coupling the clutch shaft with the throttle control so that when the vehicle is moving and the clutch is disengaged the movements of the clutch governs throttle movement. To this end a coiled spring type of clutch is employed as shown in Fig. 10. There is a sleeve 107 keyed to the control lever 69, as at 108, and this sleeve has a flange 109 which is cut away to provide an abutment 110. There is another interfitting sleeve positioned over the sleeve 107 as illustrated at 113 and it has a flange cut away to form an abutment 112, (Fig. 18). The sleeve 113 is connected to the arm 92 and indeed the arm 92 may constitute a part of a small housing 115. Surrounding the two interfitting sleeves is a coiled spring 116, the ends of which are flared outwardly at 117 and 118 in such a manner as to engage the abutments 110 and 112.

Surrounding the spring 116 is sleeve 120 with clearance relative to the spring so that the sleeve is freely rotatable relative to the spring. This sleeve 120 has a yieldable connection with the arm 104. This yieldable connection takes the form of a torsion spring 121, one end which at 122 engages the sleeve and the other end of which at 123 connects to the flange of a sleeve 124 mounted on the clutch shaft 28 and to which the arm 104 is connected. There is an additional coupling which may be termed a safety coupling between sleeve 107 and sleeve 113 and which takes the form of a pin 126 positioned in a part of the sleeve 107 and engaging in a slot 127 in the sleeve 113. The slot is considerably wider than the diameter of the pin as will be seen by reference to Fig. 18, the purposes of which will presently appear.

There is a single operation required of the operation in the control of the entire mechanism, by means of which the action of the clutch and the hydraulic system is governed. This operation may be associated and preferably is associated with the mechanism for shifting the gears in the transmission through the means of the member 8. To this end, as shown in Figs. 1 and 14, there is a movable element 8a which may be directly connected with the member 8 for shifting the gears or connected thereto through suitable linkage (not shown). There is a handle or knob 130 connected to the member 8a yieldably as by means of coiled spring 131. The member 8a has an insulated electrical contact ferrule 132 for contact with the spring 131 and the spring is grounded as shown. An electrical conductor 134 connects to the solenoid; another electrical conductor 135 extends from the solenoid to a battery or other source of power 136 which is grounded as at 137. Thus when the spring contacts the member 132, the solenoid is energized. The member 8a, near its end and between the contact 132 and the point of connection with the spring 131, is of flattened construction as shown at 138 (Fig. 17). Pressure applied by the hand of the operator on the knob in the plane of the drawing in Fig. 14 will not result in the making of an electrical contact. Thus the section 138 supports the spring 131. However, pressure applied at right angles into or in the plane of the drawings as Fig. 16 is viewed flexes the spring 131 so that an electrical contact may be established. Thus an operator may allow his hand to rest upon the knob without making an electrical contact. When the knob is pushed in any direction for shifting gears, the spring is flexed as shown in Fig. 16.

The solenoid for the valve is illustrated at 140 and the body of the valve 141 may be secured directly to the housing 4. The valve housing has the pressure inlet port 77a to which the pressure line 77 connects and it has two ports in communication with two ports 142 and 143 connecting into the sump chamber. The ports in the valve body are shown as rectangular which is an expedient formation of the ports in such a valve and it will be understood the valve may be a die casting so that the ports may be readily formed in such shape. The valve housing also has two passages which lead to the lines 79 and 82.

Within the housing is a valve member 145 acted upon by a spring 146. The valve member has a port 150 and a port 151 defined by lands 152, 153 and 154. The valve also has a passage 155 passing therethrough from end to end and it has a circumferential groove 156 which is connected to the passage 155 by an axial port 157. The valve is in a position as shown in Fig. 14 which is a normal operating condition. The pressure fluid from the pump enters at 77a, passes through port 150 into line 79 and into the engagement side of the control cylinder which is at the left hand side as shown in Fig. 12, and thus the piston rod 67 is retracted. At this time the pressure liquid in the opposite side of the control piston can escape into the sump through line 82, port 151 and port 143. If there is any leakage past the land 152, the liquid enters the groove 156 and escapes through the port 142 into the sump. In the case of leakage past the land 153 the liquid is returned to the sump through port 143. The valve itself is hydraulically balanced and any oil or liquid which may be trapped in the ends of the valve may flow through the axial passage 155 through radial port 157 into groove 156 and to the sump. When the solenoid is energized, the valve 145 is lifted magnetically to the position shown in Fig. 15. In this position, the pressure liquid entering at 77a passes through port 151, which is closed from the exhaust 143 and through line 82 to the opposite end of the control cylinder. The liquid in line 77 may be discharge through port 150 and port 142 back to the sump. It is understood, of course, that the system remains full of liquid and the lines 79 and 82 remain full of liquid and the only liquid discharged into the sump is that displaced by the movements of the control piston. It will be appreciated how shifting of the solenoid causes a shift of the control piston from one end of its cylinder to the other.

In order to provide an easily accessible and outside clutch adjustment, there is a rod 160 which connects to a part of the control arm 69 at 161 and this rod extends through a suitable abutment 162 where it is provided with a pair of suitable stop nuts 163. A spring 164 reacts against the stop 162 and a nut 165 screw threaded on the rod. Between the nut 165 and spring 164 is a washer 166 which is non-rotatably mounted on the rod 160 and the nut and washer having an interengagement at 167 comprising a recess in one and a teat on the other so that the nut may be turned for adjustment with a snap action with respect to the washer for purposes which will presently appear.

In describing the operation of the structure various additional functions of some of the parts will appear and it is believed to be most expedient to bring out these functions in a consideration of the operation, so that the function will be better understood and appreciated. In a normal at rest condition of the vehicle with the engine idling, say at 500 or 600 R. P. M. the clutch is open as shown in Fig. 1. At this time, the driven shaft and the pump are not operating. The springs 20 hold the clutch pressure plate retracted. Also the spring 164 pushes on rod 160 and acts through the control arm 69, rock shaft 28 and through sleeve 30 to swing the clutch levers toward the left as Fig. 1 is viewed. Thus the springs 20 and the outside spring 164 serve to hold the clutch disengaged under these circumstances. The adjustable nuts 163 provide a readily accessible outside adjustment for determining the amount of pressure plate retraction, and the clearance in disengagement. Upon acceleration the centrifugal clutch begins to close as centrifugal force overcomes the action of the springs 20 and the spring 164. The point of engagement can be varied by adjusting the tension on the spring 164 through the means of the nut 165. This provides a readily accessible outside adjustment for this purpose. Initially the connection between the yoke 72 and the arm 71 (Fig. 9) is set up for new clutch facings and the adjustment at this point may be made from time to time to accommodate for facing wear. Upon acceleration, the centrifugal clutch will engage at a suitable R. P. M. above engine idling speed. The centrifugal weights as above mentioned are relatively light so that there is a smooth initial engagement and as soon as the driven shaft begins to rotate the pump begins to function.

The pressure liquid is transmitted through the valve which is in the position as shown in Fig. 14 through the line 79 to the engagement side of the control piston which is the left hand side as shown in Fig. 12. Movement of the piston rocks the clutch control shaft clockwise as Fig. 9 is viewed (counterclockwise as Fig. 1 is viewed) and exerts a pull on the clutch levers 24, thus tending to turn the clutch levers in a direction which aids and supplements centrifugal force. The centrifugal weights themselves may, for example, be arranged so as not to exert enough pressure to handle full engine torque until the engine is at about 2400 R. P. M., whereas the supplemental hydraulic force may be arranged to provide such supplemental pressure that full engine torque can be handled by the clutch at about 1200 R. P. M. These figures are only exemplary.

Upon deceleration of the vehicle, the centrifugal clutch in itself would disengage at a speed above engine idling speed or, for example, at about 700 or 800 R. P. M. But since the hydraulic system is functioning, the hydraulic pressure holds the clutch closed to a lower engine R. P. M. say, for example, about 300 R. P. M. Thus, the vehicle can be slowed down and operated at a very low rate of speed. At this point the importance of the lost play between the clutch control piston and the clutch mechanism at 68 may be brought out. Force applied to the clutch levers through the sleeve 30 places an end thrust on the engine crank shaft. When the control cylinder has been shifted to the end of its clutch engagement stroke, which is the right hand end of the cylinder as shown in Fig. 12, it is stopped by the abutment as shown. At speeds, say, for example, above 2400 R. P. M., centrifugal force increases but no further movement occurs in the hydraulic system. This additional centrifugal force causes a further collapse of the spring structure 14 in the driven disc and a flexing of the cover plate with the result that the control arm 69 shifts in the slot 68 and the load exerted on the arm 69 by the piston is thereby relieved.

Let it be assumed that the vehicle was started from a standing position with the transmission gears in the box 6 set for a low gear ratio and that it is now desirable to shift in the higher gear ratio which requires clutch disengagement. The operator grasps the knob 130 and applies pressure for shifting the gears. The arrangement is such that pressure is applied in a direction so that the knob 130 is moved to the position shown in Fig. 16 and the electrical contact established between spring 131 and contact 132. This energizes the solenoid 140. The valve is lifted as shown in Fig. 15. The pressure liquid is now transmitted through port 151 and line 82 to the clutch release side of the clutch control piston which is the right hand side as Fig. 12 is viewed. This pushes the piston and projects its piston rod and swings the clutch control shaft 28 clockwise, as Fig. 1 is viewed, which, through the clutch control sleeve, the groove 34 and the involute teeth 25, swings the clutch levers to a disengaged position as shown in Fig. 1. There will always be enough hydraulic pressure to perform this function, since both the pressure and the centrifugal force increase with the square of the speed and are coordinated for this purpose. As the control piston is thus shifted, the liquid on the clutch engaging side of the piston is displaced through line 79, port 150 and back into the sump chamber 36 through the port 142. After the gear shift has been made, the operator releases the knob 130 and the electrical contact is broken, the solenoid de-energized and the valve restored to the position shown in Fig. 14, whereupon the pressure liquid is transmitted through line 77, port 77a, port 150 and line 79 to the engagement side of the piston and the liquid on the opposing side of the piston is displaced through line 82, port 151 and back to the sump through port 143. This description of clutch engagement and disengagement has been given without regard to an additional automatic control of the engine throttle in order to first clarify the action of the clutch control cylinder and the flow of the pressure liquid.

There is, however, an automatic engine control which takes over the control of the throttle when the clutch is, for example, about one-third disengaged. This automatic control takes the throttle mechanism out of the control of the driver, substantially closes the throttle, so that the engine may decelerate toward idling speed and then after the gear shift has been made and the clutch is about two-thirds engaged, the control of the throttle mechanism is restored to the driver. This is the purpose of the mechanism, largely shown in Fig. 10, and the reaction cylinder 86 as shown in Fig. 13.

It will be observed that the reaction cylinder 86 is directly connected to the pressure outlet 47 so that in all normal operating conditions of the pump, the piston 88 is shifted against the spring 89 and positioned in the left hand end of its cylinder. The position of the piston 88 controls the position of the sleeve 113 to which it is connected through the arm 92 and therefore controls the position of the shoulder 112 (Fig. 18). When the control piston starts to push the control arm 69 toward clutch disengagement position, the sleeve 107 is also rotated through its connection 108 with the arm 69. The direction of rotation of sleeve 107 is such that its abutment 110 moves in the direction of the arrow illustrated in Fig. 18, which is upwardly on the sheet of the drawings. The shoulder 110, therefore, abuts the end 117 of the spring clutch member 116 and starts to rotate it. But the opposite end of the spring 118 abuts the shoulder 112 held positioned hydraulically by the piston 88. Only a few ounces of pressure is necessary to be applied on the abutment 112 as this resistance is adequate for causing an expansion of the spring to establish a clutching engagement with the sleeve 120. As mentioned above this may occur when the clutch is about one-third disengaged. In the remaining two-thirds of the disengaging movement, the sleeve 120 is moved with the moving clutch mechanism, or in other words the shaft 28, and this moves the arm 104, to which the sleeve 120 is connected through the yieldable spring 121. This movement of the arm 104 is counterclockwise as Fig. 9 is viewed. As above pointed out the arm is connected through linkage shown to the throttle control lever 96. Therefore, in the remaining two-thirds of the disengaging movement of the clutch, the throttle is moved firmly but strongly back toward closed position, which is engine idling position, and the control treadle pedal 95 is likewise pushed back to engine idling position against the weight of the foot of the operator. The energizing piston 88 functions to locate the abutment 112 in an energizing position only when there is a supply of liquid under pressure. Therefore, it is only when the driven shaft 5 is operating that the coil spring clutch becomes engaged. When the vehicle is standing at rest or when it decelerates to a substantially at rest condition the throttle is free and completely under the control of the operator.

It will be appreciated that the clutch control mechanism will move to complete disengaging position. Under some circumstances, the throttle may be only partially open when the clutch is disengaged and therefore does not have the range of movement that the clutch mechanism has. This is the reason for the use of the spring 121. When the throttle has moved to closed position and can move no further, the clutch mechanism continues to move to full clutch disengagement position and the spring 121 yields to permit of this action. In the above action, the rotation of the spring 116 forces rotary movement of the sleeve 113 and therefore forces the piston 88 to shift to the right as Fig. 13 is viewed against the pressure of the liquid. But this energizing cylinder is small and the liquid is merely displaced back through the line 87 which connects to the outlet 47 and outlet line 77. The hydraulic pressure on the energizing piston 88 keeps the clutch spring energized through this entire period. Upon clutch engagement, the parts move reversely and when the piston 88 reaches the end of its movement the abutment 112 stops while the abutment 110 follows the clutch engaging action and the expanding and energizing on the spring is discontinued. Thus the accelerator is firmly moved back from engine idling position to substantially the original position where it was coupled with the clutch operating mechanism and then it is released by the de-energization of the clutch spring 115 and restored to the control of the driver. If for any reason, the piston 88 might be a little sluggish or lag behind the clutch mechanism in clutch engaging movement, the auxiliary pin 126 will pick up the sleeve 113 and cause the sleeve and piston to return to normal energizing position. This is merely a safety factor. The adjustment at 91 between the piston 88 and the arm 92 established the normal position of the abutment 112. Therefore, this determines the point in the clutch engagement and disengagement actions where the throttle mechanism is coupled to and released from the clutch operating mechanism. As mentioned above the engagement may take place when the clutch is about one-third disengaged and may be discontinued when the clutch is about two-thirds engaged.

Accordingly, the driver of the vehicle is required only to apply pressure on the gear shift knob 130; this starts the clutch disengaging action; the functioning of the throttle is taken away from the driver during clutch disengagement and the throttle gradually and firmly moves to closed position; when the operator releases the knob, after the gear shift has been made, the clutch starts its engagement; the throttle control mechanism is firmly moved back toward open position and then the control thereof is restored to the driver at substantially the position it was taken away from the driver when the clutch is about two-thirds engaged.

It will be apparent that this standardizes the control of the engine and clutch engagement and disengagement in the normal operation of a vehicle. Yet it gives to the individual driver a wide latitude in which to exercise his prerogatives as to how he may elect to operate the vehicle. In other words, it is at the driver's election at what speeds of vehicle movement the gear shift is to be made. The driver may operate the vehicle indefinitely in any gear regardless of speed. The engine may be controlled and operated or raced while the vehicle is standing at rest because in the actuation of the throttle, the sleeve 120 freely oscillates relative to the coil spring 116. In other words, it is only in the course of a clutch disengagement while the vehicle is moving that the spring 116 is energized to cause the clutch mechanism to take over the control of the throttle.

A modified form of control is shown in Figs. 19 and 20. In this form of control, the clutch and the hydraulic system is the same as that heretofore described and the modification relates to the control of the throttle. Such parts as have been heretofore described and which are the same in the modified form, bear the same reference characters and re-description is unnecessary. In this form the accelerator treadle is shown at 180, connected by a link 181 to a crank having an arm 182 and a yoke shaped arm 183. Carried in the yoke on trunnions 184 is a cylinder 185 acted upon by a retractor spring 186. Within the cylinder is a piston 187 acted upon by a spring 188 and the piston is connected by a rod 189 to the throttle lever 190. There is no mechanical connection between this throttle control and the clutch mechanism but a pressure line 87a connects into the cylinder at 191 and this pressure line connects at 192 to the pressure line 82 which is the disengagement pressure line for the control cylinder 65.

In normal operation with the clutch engaged, the liquid pressure from the pump is applied to the control cylinder through the line 79 and therefore there is no pressure in the line 82 or line 87a or in the cylinder 185. Therefore the spring 88 shifts the piston 187 to a normal position at the right hand end of the cylinder as Fig. 19 is viewed. This spring 188 has sufficient strength so that when the accelerator is depressed the throttle is moved toward open position by force transmitted through cylinder 185 and spring 188 to the rod 189. However, when the clutch begins disengagement, by reason of the introduction of liquid under pressure into line 82, the pressure liquid enters the cylinder 185 and pushes the piston 187 to the opposite end of the cylinder. This shortens the coupling in the control line so that, even if the accelerator pedal 180 is pushed all the way down, the stroke of the piston is long enough to cause a movement of the throttle lever 190 to substantially closed position. When the accelerator 180 is released and retracted by the spring 186, the movement of the piston 187 hydraulically will cause the spring 195 to be compressed. Thus, although the operator may shift the accelerator pedal 180 as he desires, the throttle control is disabled during clutch disengagement. Upon clutch engagement, however, the pressure liquid in the cylinder 185 is relieved and the piston returns to its normal extended position as shown in Fig. 19 so that throttle control is re-established.

I claim:

1. A mechanism for transmitting the power of an engine in an automotive vehicle comprising, a clutch having members arranged to be frictionally engaged and disengaged, centrifugal weight means mounted upon a driving member for engaging the clutch, said centrifugal means being such as to provide clutch engagement pressure relatively light as regards the full torque capacity of the engine at relatively low R. P. M. and means operable from a member driven by the clutch and acting upon the clutch to supplement the engagement pressure thereof.

2. A mechanism for transmitting the power of an engine such as an engine of an automotive vehicle comprising, driving friction clutch members rotatable with the engine, a driven friction clutch member, a driven member connected to the driven clutch member, means normally holding the clutch members disengaged at and below engine idling speed, centrifugal means for engaging the clutch upon acceleration of the engine above idling speed, a control member connected to the centrifugal means for the clutch shiftable in a clutch engaging direction and in a clutch disengaging direction, actuating means operable on the control member for shifting the same, power means operable from the driven shaft, means for transmitting the power of said means to the actuating means, to shift the control member in clutch engaging direction to add to the centrifugal engagement pressure of the clutch and control means operable to reverse the direction the application of the power on the actuating means to disengage the clutch against centrifugal force.

3. A mechanism for transmitting the power of an engine such as an engine of an automotive vehicle comprising, driving friction clutch members rotatable with the engine, a driven friction clutch member, a driven member connected to the driven clutch member, means normally holding the clutch members disengaged at and below engine idling speed, centrifugal means for engaging the clutch upon acceleration of the engine above idling speed, a control member connected to the centrifugal means for the clutch shiftable in a clutch engaging direction and a clutch disengaging direction, actuating means operable on the control member for shifting the same, a hydraulic system including a pump for liquid operable from the driven member, means for transmitting the pressure of the pump liquid to the actuating means to add to the clutch packing pressure and a control valve shiftable to reverse the direction of the application of the liquid pressure on the actuating member to disengage the clutch.

4. In combination, an internal combustion engine, a gear change transmission for transmitting engine torque, a centrifugal clutch of the friction type located between the engine and transmission and having centrifugal weights rotatable with the engine whereby the clutch is engaged incident to the operation of the engine, a hydraulic system including a pump for liquid operable by a member driven by the clutch, a motor operable by liquid pressure and operably connected with the clutch, a control valve between the pump and the motor for passing liquid to the motor to actuate the motor in a direction to apply engagement pressure on the clutch, a shiftable control element for the transmission for effecting a change in the gearing and means movably mounted on the shiftable control element for shifting the same and operable upon movement relative to the shiftable control element to shift the valve to conduct the liquid to the motor for reverse movement thereof for clutch disengagement.

5. In combination, an internal combustion engine, a gear change transmission for transmitting engine torque, a centrifugal clutch of the friction type between the engine and the transmission and having centrifugal weights rotatable with the engine, whereby the clutch is engaged incident to the operation of the engine, power means operable by a member driven by the clutch, means operably connecting the power means to the clutch and normally acting upon the clutch to supplement the centrifugal force of clutch engagement when the said clutch driven member is operating, a shiftable control element for the shifting of gears in the transmission and means movably mounted on the shiftable control element for shifting the same and operable incident to its shift of the control element to reverse the direction of the application of power on the clutch for clutch disengagement.

6. A mechanism for the transmission of torque comprising, a driving member, a driven member, driving and driven friction clutch members, centrifugal means on a driving clutch member for engaging the clutch upon adequate R. P. M. of the driving member, clutch control means positively connected to the centrifugal means and shiftable in a direction for applying packing pressure to the clutch and in a direction to cause clutch disengagement, hydraulic means for acting upon the clutch control means including a liquid pump operable by the driven member, said pump being of a type wherein the pressure on the liquid afforded thereby varies with the square of the speed of rotation, so that the hydraulic pressure varies substantially uniformly with the variation of the centrifugal force, and control means operable to selectively apply the liquid pressure on the said clutch control means to add to the clutch packing pressure and reverse the direction of application on the control means to effect clutch release.

7. In combination, a driving member, a driven member, a friction clutch for coupling the members together and having centrifugal weights on the driving member for engaging the clutch, a clutch control member positively connected to the centrifugal weights and shiftable in a direction for applying packing pressure to the clutch and shiftable in a direction for disengaging the clutch, power means operable by a driven member having an element operable in a clutch engaging direction and a clutch disengaging direction, control means operable to cause movement of the element in the selected direction and a connection between the element and the clutch control member for shifting the clutch control member in opposite directions, said connection embodying a lost play coupling, whereby, the thrust of the element is removed from the clutch control member when the clutch is engaged incident to the increased centrifugal force upon increase of R. P. M.

8. In an automotive vehicle including an internal combustion engine and a driven element, a centrifugal clutch between the engine and the element having one or more driving members rotatable with the engine and a driven member for rotating the element, one of the driving members having centrifugal weights thereon, the clutch and weights being arranged so that the clutch is disengaged at the idling R. P. M. of the engine and so that the clutch engages under the action of centrifugal force upon increase of the engine R. P. M. over idling R. P. M. whereby, increase of the engine R. P. M. initiates vehicle movement and power means having an actuating part connected to the centrifugal weights and operable by the driven element for applying clutch engaging forces on the centrifugal weights and arranged to maintain the clutch engaged as the vehicle decelerates to a speed of movement lower than that which corresponds to the idling R. P. M. of the engine, control means operable to reverse the application of the force of the power means on the centrifugal weights to disengage the clutch at any operating R. P. M.

9. In an automotive vehicle including an internal combustion engine and a driven element, a centrifugal clutch between the engine and the element having one or more driving members rotatable with the engine and a driven member for rotating the element, one of the driving members having centrifugal weights thereon, the clutch and weights being arranged so that the clutch is disengaged at the idling R. P. M. of the engine and so that the clutch engages under the action of centrifugal force upon increase of the engine R. P. M. to initiate vehicle movement, a hydraulic system including a pump operable by the driven element and including a power element with a shiftable device operably connected to the centrifugal weights to apply centrifugal weights packing forces on the clutch when the vehicle is moving and arranged to maintain the clutch engaged when the vehicle decelerates to a rate of speed lower than that corresponding to engine idling speed.

ERNEST E. WEMP.

References Cited in the file of this patent

UNITED STATES PATENTS

| Number | Name | Date |
|---|---|---|
| 1,806,158 | Giger | May 19, 1931 |
| 2,073,692 | Griswold | Mar. 16, 1937 |
| 2,074,476 | Kolb | Mar. 23, 1937 |
| 2,079,822 | Serra | May 11, 1937 |
| 2,087,643 | Gillett | July 20, 1937 |
| 2,104,061 | Surdy | Jan. 4, 1938 |
| 2,118,123 | Watts | May 24, 1938 |
| 2,144,022 | Kliesrath | Jan. 17, 1939 |
| 2,153,509 | Rockwell | Apr. 4, 1939 |
| 2,168,682 | Paine | Aug. 8, 1939 |
| 2,183,481 | Johnson | Dec. 12, 1939 |
| 2,197,480 | Neill | Apr. 16, 1940 |
| 2,230,050 | Nutt et al. | Jan. 28, 1941 |
| 2,248,377 | Nutt | July 8, 1941 |
| 2,256,258 | Flickinger | Sept. 16, 1941 |
| 2,328,090 | Nutt et al. | Aug. 31, 1943 |
| 2,328,092 | Nutt et al. | Aug. 31, 1943 |
| 2,356,598 | Lang et al. | Aug. 22, 1944 |
| 2,422,155 | Wemp | June 10, 1947 |
| 2,479,532 | Wemp | Aug. 16, 1949 |